US007634629B2

(12) United States Patent
Nemiroff et al.

(10) Patent No.: US 7,634,629 B2
(45) Date of Patent: Dec. 15, 2009

(54) MECHANISM TO CONTROL ACCESS TO A STORAGE DEVICE

(75) Inventors: Daniel Nemiroff, Folsom, CA (US);
Howard C. Herbert, Phoenix, AZ (US);
Nimrod Diamant, Kfar-Saba (IL);
Moshe Maor, Kiryat Mozkin (IL);
Carey W. Smith, Hillsboro, OR (US);
Amber Huffman, Banks, OR (US);
Fran Corrado, Newton, MA (US);
Michael A. Rothman, Sammamish, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 11/316,068

(22) Filed: Dec. 19, 2005

(65) Prior Publication Data
US 2007/0143555 A1 Jun. 21, 2007

(51) Int. Cl.
G06F 13/00 (2006.01)
G06F 13/28 (2006.01)
(52) U.S. Cl. ...................... 711/163; 711/154
(58) Field of Classification Search ........... None
See application file for complete search history.

(56) References Cited

U.S. PATENT DOCUMENTS

| 4,757,533 | A | * | 7/1988 | Allen et al. ............ 713/192 |
| 6,031,757 | A | * | 2/2000 | Chuang et al. ......... 365/185.04 |
| 6,647,481 | B1 | * | 11/2003 | Luu et al. ............ 711/206 |
| 6,988,250 | B1 | * | 1/2006 | Proudler et al. ............ 716/1 |
| 2003/0225960 | A1 | | 12/2003 | Guu et al. |
| 2004/0088513 | A1 | * | 5/2004 | Biessener et al. ............ 711/173 |

FOREIGN PATENT DOCUMENTS

WO    WO 93/13477    7/1993

* cited by examiner

Primary Examiner—Kevin Verbrugge
Assistant Examiner—Eric S Cardwell
(74) Attorney, Agent, or Firm—Blakely, Sokoloff, Taylor & Zafman LLP

(57) ABSTRACT

A computer system is disclosed. The computer system includes a storage device, a device controller and a chipset. The device controller includes lock registers having values that correspond to the ranges of locked sectors of the storage device. The lock registers verify if a storage device access request is targeted for ranges of sectors of the storage device that are locked. The chipset includes an embedded controller to authenticate the storage device access request and to manage configuration of the storage device.

25 Claims, 4 Drawing Sheets

MECHANISM TO CONTROL ACCESS TO A STORAGE DEVICE

FIELD OF THE INVENTION

The present invention relates to computer systems; more particularly, the present invention relates to computer system interaction with hard disk storage devices.

BACKGROUND

Currently, there is a single method to block read/write access to sectors of a hard disk drive. This method is known as Host Protected Area (HPA) and is defined by Technical Committee T13 industry standards group, which is part of the International Committee on Information Technology Standards (INCITS) responsible for interface standards relating to the AT Attachment (ATA) storage interface. The disadvantage of HPA is that the mechanism allows for a single set of sectors or a single region of a hard disk drive to be protected. In addition, HPA is cumbersome in that it is difficult to dynamically lock and unlock read/write access to the protected region.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Figure 1:
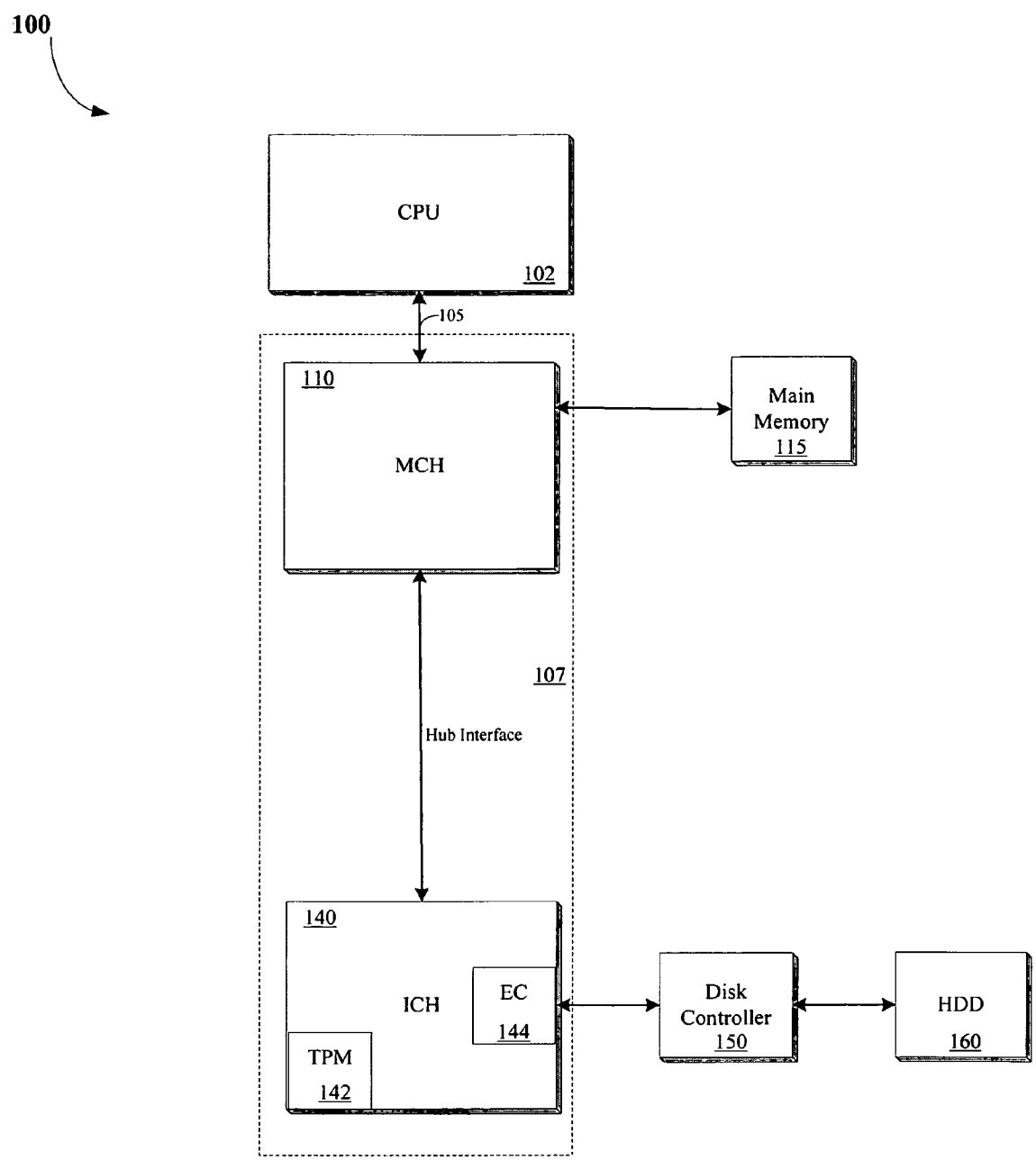
FIG. 1 is a block diagram of one embodiment of a computer system.

A mechanism to protect access to a storage device is described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), FIG. 1 is a block diagram of one embodiment of a computer system 100. Computer system 100 includes a central processing unit (CPU) 102 coupled to bus 105. A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100.

In one embodiment, main system memory 115 includes dynamic random access memory (DRAM); however, main system memory 115 may be implemented using other memory types. For example, in some embodiments, main system memory 115 may be implemented with a non-volatile memory.

MCH 110 is coupled to an input/output control hub (ICH) 140. In one embodiment, MCH 110 and ICH 140 are coupled via a hub interface. ICH 140 provides an interface to input/ output (I/O) devices within computer system 100. According to one embodiment, ICH 140 includes a trusted platform module (TPM) 142.

TPM 142 includes protected registers that are writable by commands that may only be initiated by trusted microcode in CPU 102. Protected microcode is microcode whose execution may be initiated by authorized instruction(s) and/or by hardware that is not controllable by unauthorized devices. ICH 140 also includes an embedded controller (EC) 144 to control access to a hard disk drive (HDD) 160 via a disk controller 150.

Dynamic Protection of Multiple HDD Regions

Figure 2:
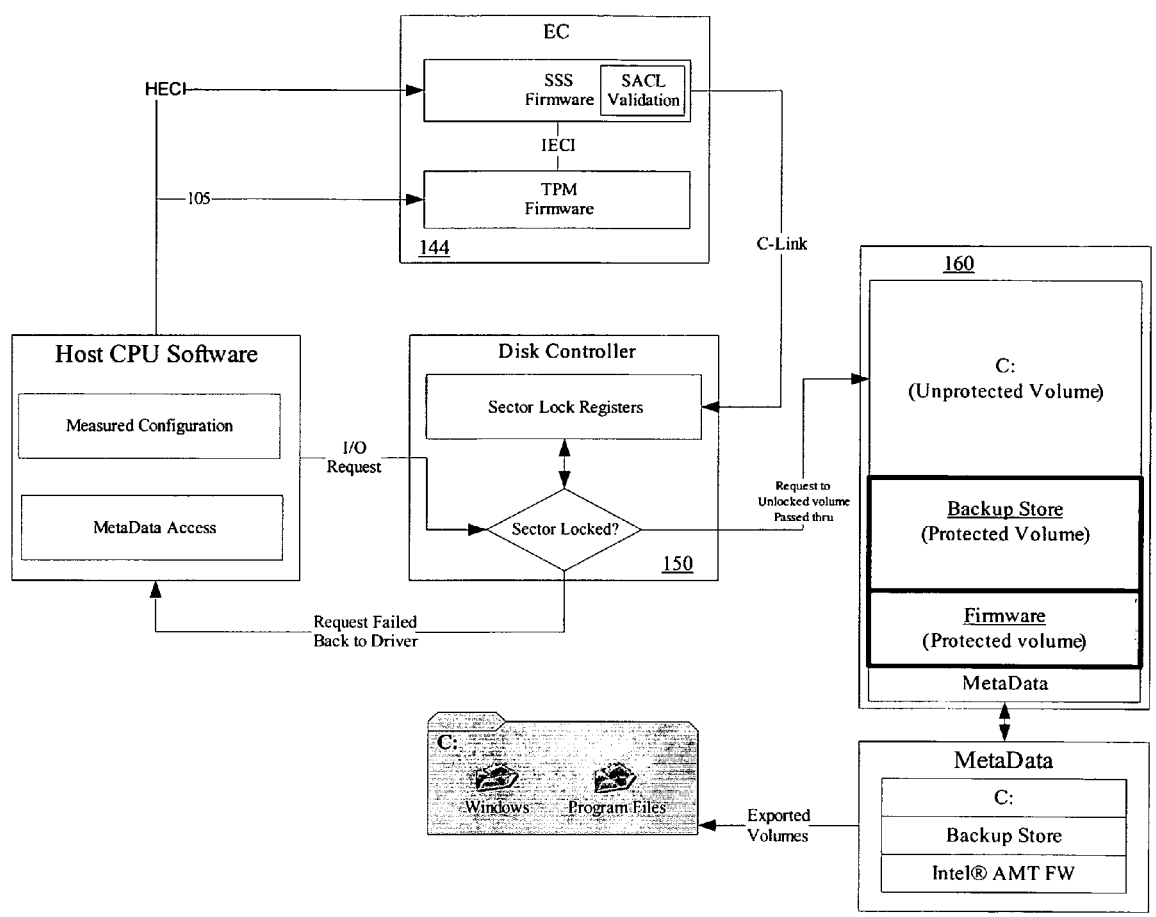
FIG. 2 illustrates another embodiment of a computer system.

According to one embodiment, multiple regions of HDD 160 may be protected where dynamic lock and unlock of read/write access to each of these regions is provided. FIG. 2 illustrates one embodiment of a logic representation of computer system 100. As shown in FIG. 2, host CPU software communicates with EC 144 and disk controller 150, with disk controller 150 accessing HDD 160.

According to one embodiment, disk controller 150 is a Serial ATA (SATA) controller that performs standard SATA functionality. In a further embodiment, controller 150 also includes functionality to verify (on a block by block basis) if a given host CPU software HDD read or write command request is targeted for sectors that may be locked.

To enable this functionality, disk controller 150 includes a bank of registers that define the ranges of sectors that are locked. If the sectors are unlocked, the HDD read or write command request will be accepted and processed by disk controller 150. If the sectors are locked, the HDD read or write command request will be rejected and an error will be returned by the SATA controller to the host CPU software.

In order to reject read or write command requests targeted for locked sector ranges, disk controller 150 includes banks of comparator logic (not shown). In one embodiment, the comparator logic compares the sector ranges included in each host CPU software read or write command request with a set of sector lock registers including values that correspond to the ranges of locked sectors. If the sectors are locked, the read or write command request will be rejected by the SATA controller as shown in FIG. 2.

EC 144 includes Trusted Platform Module (TPM) firmware and SATA Sector Security (SSS) firmware. The TPM firmware receives measurements (cryptographic hashes) from host CPU software that is about to be executed via a Front-Side Bus (FSB), such as bus 105. The measurements indicate that the host CPU software has been previously measured. In such an embodiment, these measurements are stored in one or more TPM 142 registers described with respect to FIG. 1.

The SSS firmware manages the configuration of disk controller 150 registers that lock and unlock ranges of sectors via a C-Link bus. In addition, the SSS firmware receives lock and unlock sector commands from a currently executing host CPU software via a Host Embedded Controller Interface (HECI). Further, the SSS firmware requests the identity of currently executing host CPU software from the TPM firmware via an Internal Embedded Controller Interface (IECI).

The SSS firmware verifies that the identity of the host CPU software and the sector range passed in the lock or unlock sector commands match at least one entry in a Sector Access Control List (SACL) managed by the SSS firmware. If there is a SACL match, the lock or unlock sector command request will be accepted and processed by the SSS firmware. If there is no SACL match, the lock or unlock sector command request will be rejected and an error will be returned by the SSS firmware to the host CPU software.

According to one embodiment, the host CPU software includes an operating system (OS) file system, an OS SATA driver, an OS HECI driver, a BIOS SATA Option-ROM (OROM), and a BIOS HECI driver. The host CPU software works with the TPM firmware over the FSB to measure other host CPU software prior to its execution.

The host CPU software also works with the SSS firmware over HECI to provision and manage the Sector Access Control List (SACL). Additionally, the host CPU software works with the SSS firmware over HECI to issue lock or unlock sector command requests. Moreover, the host CPU software works with the disk controller 150 to issue HDD read or write command requests. In one embodiment, the host CPU software divides HDD 150 into logical volumes and determines the states (protected/unprotected) of each volume. Further, the volume divisions are recognized based upon MetaData.

Figure 3:
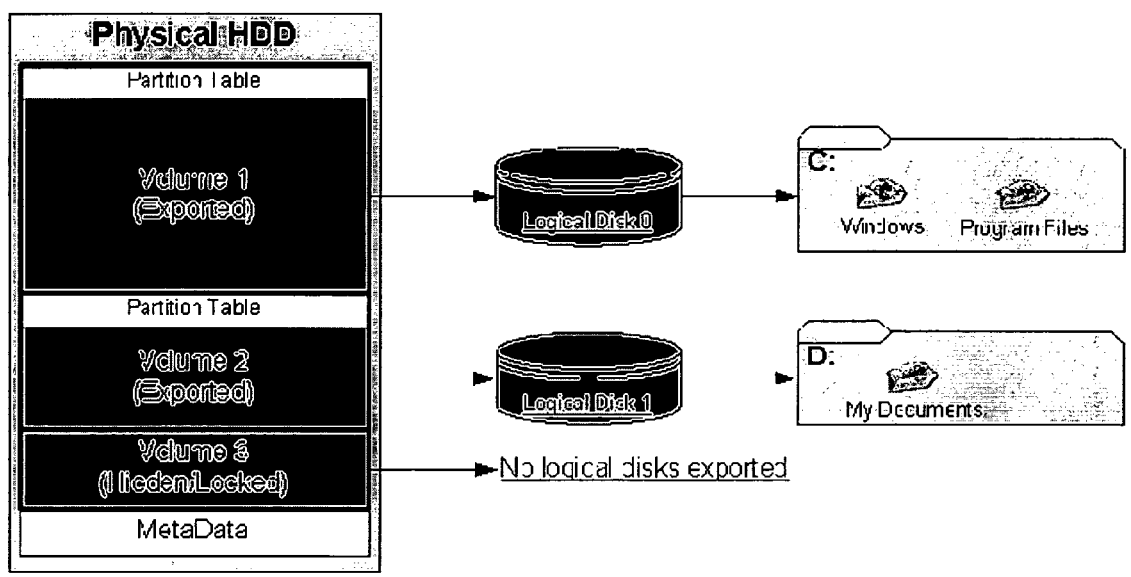
FIG. 3 illustrates one embodiment of a hard disk drive.

According to one embodiment, HDD 160 is abstracted via Redundant Array of Inexpensive Disks (RAID) software. Thus in this embodiment, the RAID software will divide a single hard disk drive into multiple logical volumes. FIG. 3 illustrates one embodiment of HDD 160 partitioned into separate local volumes.

In a further embodiment, each volume will have additional attributes of exported/hidden and locked/unlocked to augment protection. One such attribute includes exported volumes being visible to the host operating system as logical hard disk drives. Other attributes include hidden volumes not being visible to the host operating system, unlocked volumes allowing read/write access and locked volumes not allowing read/write access. Typically, protected volumes will be both hidden and locked as shown in FIG. 3.

Referring back to FIG. 2, HDD 160 may include an unprotected volume, a protected volume used to store backup data and a protected volume to store firmware. The protected firmware may be for example additional system applications that otherwise would be stored in system Flash. Since Flash memory devices are relatively expensive compared to HDD space, and since the volume may be protected, HDD 160 is an ideal location to store system application.

MetaData is also stored at HDD 160 to describe the partitioning of HDD 160. For example, the MetaData may indicate the first volume is stored at sectors 0-100, the second volume at sectors 101-200 and the third volume at sectors 201-300 of HDD 160. According to one embodiment, the MetaData is stored in a protected range. As discussed above, the MetaData is maintained at the host CPU software.

Also described above, there is no method for host CPU software to directly access the sector lock registers of disk controller 150 for trusted lock/unlock processing. Instead, the sector lock registers are accessed by the SSS firmware via the C-link bus after a host CPU software lock/unlock requests is validated against the SACL as shown in FIG. 2.

It should be noted that once unlocked, all host CPU software (including a virus if present) may gain access to the particular range of sectors. Thus, to prevent virus-infected host CPU software from gaining access, lock/unlock sector commands are issued when the configuration (identity) of the platform has been captured by the TPM firmware.

If the TPM measurement chain only extends up through pre-OS boot host CPU software (BIOS), then lock/unlock sector commands are issued by BIOS software up until OS boot begins. If the measurement chain extends up through the OS kernel and its device drivers, then lock/unlock sector requests can be issued by OS kernel software until OS application software execution begins. In all cases, all sector ranges that are to be protected from unknown software are to be locked-down before beginning to execute software that does not continue the TPM measurement chain.

The dynamic protection mechanism protects multiple regions of a HDD with restrictions on the number of volumes created being based upon the number of lock/unlock register banks that are available at the disk controller. In addition, the mechanism dynamically locks and unlocks read/write access to each of the regions.

Local Block Addressing Protection

In many instances personal computers (such as computer system 100), are used in public areas which allow access to a myriad of users. As a result it is often difficult to prevent access to sensitive data on a hard disk from unauthorized users. As discussed above with respect FIG. 1, disk controller 150 controls access to HDD 160.

According to one embodiment, disk controller 150 enables administrative access to content on HDD 160. In a further embodiment, disk controller 150 enables more fine-grained access levels to be bestowed upon Local Block Addressing (LBA) ranges on HDD 160. In LBA each sector is assigned a unique sector number rather than referring to a cylinder, head and sector number. Thus, the sectors are numbered 0, 1, 2, etc. up to (N−1), where N is the number of sectors on the disk.

In one embodiment, logic within disk controller 150 facilitates access control to physical block locations such that read-only, write-only, and no-access block addresses may be implemented at the controller level. Such access control enables enforcement of partition protection schemes which otherwise were only enforceable through a tacit arrangement between the OS entities for partition schemes. For example, a partition may be enabled to be a "protected" partition that allows only authorized users to access the contents. Additionally, protection may be provided to a scatter-gather list of LBA numbers which correspond to certain file(s) or structure data which are to be protected.

Based on the partition protection an unauthorized user that logs in to computer system may access unprotected blocks that are used. However, the unauthorized user will be unable to access protected blocks since those blocks are locked. In one embodiment, the protected blocks are locked using an encryption algorithm implemented at disk controller 150 via TPM 142.

When an authorized user logs in, the protected blocks are unlocked, thus permitting the authorized user to access the protected blocks as well as the used unprotected blocks. In a further embodiment, the protected blocks remained locked even after HDD 160 has been removed. Therefore, the protected blocks remain protected if HDD 160 is moved to a different computer system.

Figure 4:
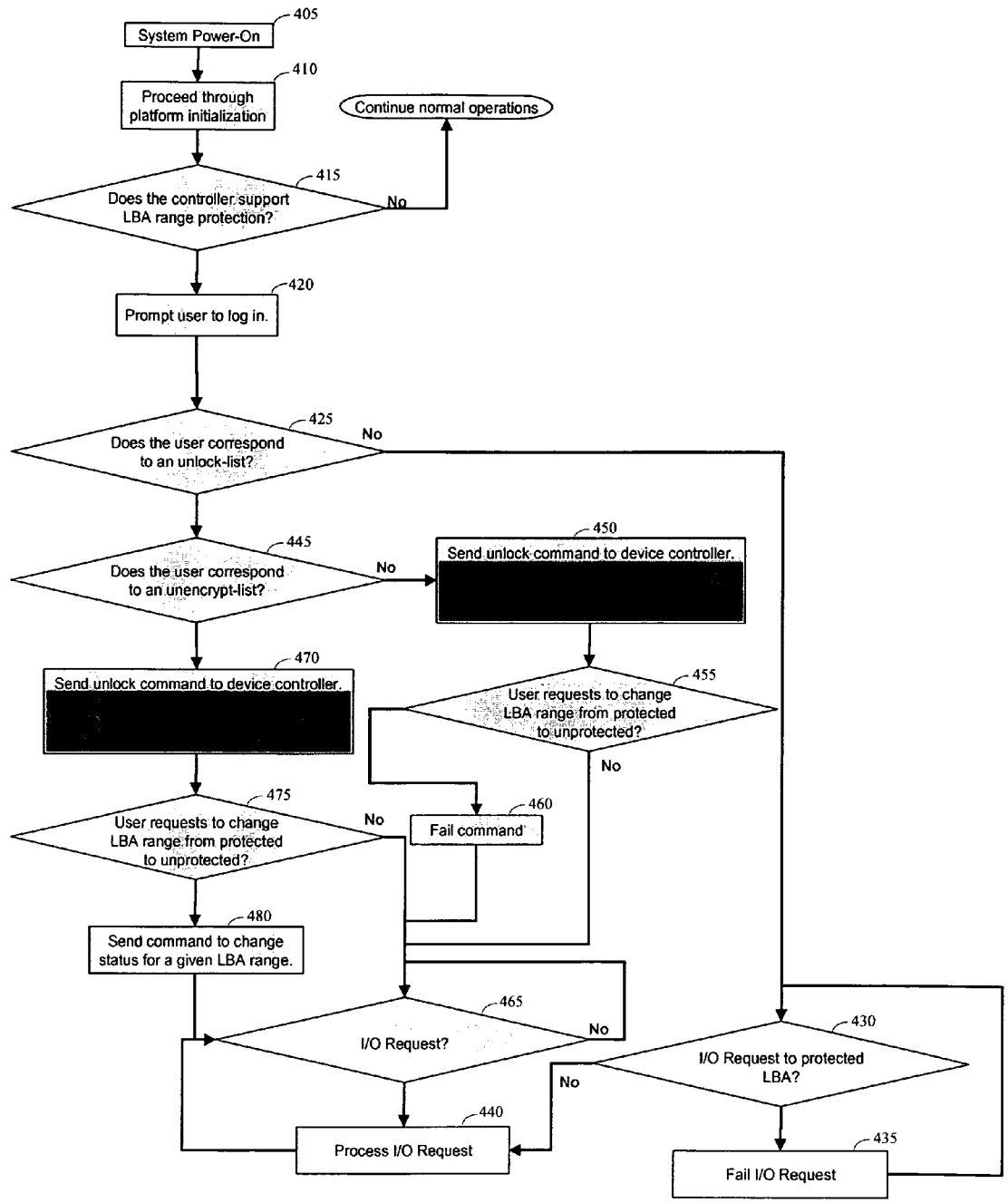
FIG. 4 is a flow diagram for one embodiment for providing Logical Block Addressing protection.

FIG. 4 is a flow diagram for one embodiment for providing LBA protection. At processing block 405, computer system 100 is powered on. At processing block 410, the computer system 100 initialization process occurs. At decision block 415, it is determined whether disk controller 150 supports LBA range protection. If not, computer system 100 continues to operate under normal conditions.

However if disk controller 150 supports LBA range protection the system user is prompted to sign in, processing block 420. At decision block 425, it is determined whether the user corresponds to an unlock list. If the user does not correspond to an unlock list it is determined for future I/O requests whether the request is to a protected LBA, decision block 430. If the request is to a protected LBA, the I/O request is failed and access is not allowed to the LBA, processing block 435. If, however, the request is to an unprotected LBA the I/O request is processed.

Referring back to decision block 425, if the user corresponds to an unlock list, it is determined whether the user corresponds to an unencrypt list, decision block 445. If the user corresponds to an unencrypt list, an unlock command may be transmitted to disk controller 150, processing block 450. The unlock command may optionally support various control levels (e.g., read enable, write enable and read-write enable).

At decision block 455, it is determined whether the user requests to change the LBA range from protected to unprotected. If there is a request to change the LBA range from protected to unprotected, the command is failed at processing block 460. At decision block 465, it is determined whether an I/O request has been received. If so, the request is processed at processing block 440. If at decision block 455 the user does not request to change the LBA range from protected to unprotected, control is forwarded to decision block 465, where it is determined whether an I/O request has been received, and on to processing block 440 where the request is processed.

Referring back to decision block 445, if the user corresponds to an unencrypt list an unlock command may be transmitted to disk controller 150, processing block 470. At decision block 475, it is determined whether the user requests to change the LBA range from protected to unprotected. If there is not a request to change the LBA range from protected to unprotected, control is forwarded to decision block 465, where it is determined whether an I/O request has been received, and on to processing block 440 where the request is processed. If there is a request to change the LBA range from protected to unprotected, the command is transmitted to the disk controller to change the status of a particular LBA, processing block 480.

By enabling controller-level no-access, read-only, and write-only LBA ranges, a mechanism is provided to protect content which had previously not been able to be protected in a standard manner. In addition to access control mechanisms, seamless encryption of protected data is enabled. Thus, if media with protected content is removed from the physical system, the media is still protected by of a locally controlled (via TPM) encryption strategy.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer system comprising:
   a storage device;
   a chipset having an embedded controller to authenticate a storage device access request and to manage configuration of the storage device; and
   a device controller including:
      lock registers having values that correspond to ranges of locked sectors of the storage device, the lock registers to verify if a storage device access request is targeted for ranges of sectors of the storage device that are locked;
      Sector Security (SS) firmware to manage the lock registers to unlock a first range of sectors of the storage device by accessing a first set of lock registers corresponding to the first range of sectors and to lock a second range of sectors of the storage device lock registers by accessing a second set of lock registers corresponding to the second range of sectors; and comparator logic to compare sector ranges included in a storage device access request received from the chipset with the lock registers, wherein the controller rejects the request if the lock registers indicate that the corresponding range of sectors is locked.

2. The computer system of claim 1 further comprising a host system to provide the storage device access request.

3. The computer system of claim 2 wherein the device controller processes the storage device access request if the targeted for ranges of sectors of the storage device are unlocked.

4. The computer system of claim 3 wherein the device controller rejects the storage device access request if the targeted for ranges of sectors of the storage device are locked.

5. The computer system of claim 4 wherein the device controller further transmits an error to the host system if the targeted for ranges of sectors of the storage device are locked.

6. The computer system of claim 2 wherein the embedded controller comprises:

Trusted Platform Module (TPM) firmware to authenticate the access requests received from the host system.

7. The computer system of claim 6 wherein the TPM firmware receives measurements from the host system via a Front-Side Bus (FSB) indicating that the host system has been previously measured.

8. The computer system of claim 6 wherein the SS firmware manages the device controller via a bus.

9. The computer system of claim 8 wherein the SS firmware receives lock and unlock sector commands from the host system via a Host Embedded Controller Interface (HECI) to manage the lock registers.

10. The computer system of claim 9 wherein the SS firmware requests the identity of the host system from the TPM firmware via an internal interface to verify that the identity of the host system and a sector range passed in the lock or unlock sector commands match at least one entry in a Sector Access Control List (SACL) managed by the SSS firmware.

11. The computer system of claim 2 wherein the host system divides the storage device into logical volumes and determines whether each volume is protected or unprotected.

12. The computer system of claim 11 wherein the volume divisions are recognized based upon MetaData.

13. The computer system of claim 11 wherein the storage device includes an unprotected volume, a protected volume used to store backup data and a protected volume to store firmware.

14. A computer system comprising:

an embedded controller to authenticate a storage device access request and to manage configuration of the storage device; and a device controller including:

lock registers having values that correspond to ranges of locked sectors of the storage device, the lock registers to verify if a storage device access request is targeted for ranges of sectors of the storage device that are locked;

Sector Security (SS) firmware to manage the lock registers to unlock a first range of sectors of the storage device by accessing a first set of lock registers corresponding to the first range of sectors and to lock a second range of sectors of the storage device lock registers by accessing a second set of lock registers corresponding to the second range of sectors; and comparator logic to compare sector ranges included in a storage device access request received from the chipset with the lock registers, wherein the controller rejects the request if the lock registers indicate that the corresponding range of sectors is locked.

15. The computer system of claim 14 wherein the device controller processes the storage device access request if the targeted for ranges of sectors of the storage device are unlocked.

16. The computer system of claim 15 wherein the device controller rejects the storage device access request if the targeted for ranges of sectors of the storage device are locked.

17. The computer system of claim 16 wherein the device controller further transmits an error to a host system if the targeted for ranges of sectors of the storage device are locked.

18. The computer system of claim 15 wherein the embedded controller comprises Trusted Platform Module (TPM) firmware to authenticate the access requests received from a host system.

19. The computer system of claim 18 wherein the TPM firmware receives measurements from the host system via a Front-Side Bus (FSB) indicating that the host system has been previously measured.

20. The computer system of claim 18 wherein the SS firmware manages the device controller via a bus.

21. The computer system of claim 20 wherein the SS firmware receives lock and unlock sector commands from the host system via a Host Embedded Controller Interface (HECI) to manage the lock registers.

22. The computer system of claim 21 wherein the SS firmware requests the identity of the host system from the TPM firmware via an internal interface to verify that the identity of the host system and a sector range passed in the lock or unlock sector commands match at least one entry in a Sector Access Control List (SACL) managed by the SSS firmware.

23. The computer system of claim 15 wherein the host system divides the storage device into logical volumes and determines whether each volume is protected or unprotected.

24. The computer system of claim 23 wherein the volume divisions are recognized based upon MetaData.

25. The computer system of claim 24 wherein the storage device includes an unprotected volume, a protected volume used to store backup data and a protected volume to store firmware.

* * * * *